US012525100B2

United States Patent
Sugiyama

(10) Patent No.: US 12,525,100 B2
(45) Date of Patent: Jan. 13, 2026

(54) TRANSACTION SETTLEMENT DEVICE THAT SWITCHES BETWEEN CLERK AND CUSTOMER OPERATING MODES FOR CANCELING OR PERMITTING REGISTRATION OF PRODUCTS

(71) Applicant: Toshiba Tec Kabushiki Kaisha, Tokyo (JP)

(72) Inventor: Ayumi Sugiyama, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/664,148

(22) Filed: May 14, 2024

(65) Prior Publication Data

US 2025/0046160 A1 Feb. 6, 2025

(30) Foreign Application Priority Data

Aug. 3, 2023 (JP) .................................. 2023-127283

(51) Int. Cl.
*G07G 1/00* (2006.01)
*G06Q 20/20* (2012.01)
*G07G 1/01* (2006.01)

(52) U.S. Cl.
CPC ......... *G07G 1/0036* (2013.01); *G06Q 20/208* (2013.01); *G07G 1/01* (2013.01)

(58) Field of Classification Search
CPC ..... G06Q 20/20; G06Q 20/202; G06Q 20/204
USPC .............................. 235/383; 705/16–18, 23
See application file for complete search history.

(56) References Cited

U.S. PATENT DOCUMENTS

| 2007/0255665 | A1 | 11/2007 | Oosugi |
| 2011/0210168 | A1* | 9/2011 | Haibara ............... G07G 1/0054 235/375 |
| 2019/0259017 | A1* | 8/2019 | Gotanda ............... G06Q 20/20 |
| 2020/0409449 | A1 | 12/2020 | Rambler |

(Continued)

FOREIGN PATENT DOCUMENTS

| JP | 2013045406 A | 3/2013 |
| JP | 2020035328 A * | 3/2020 |
| WO | 2023056229 A1 | 4/2023 |

OTHER PUBLICATIONS

Machine translation of JP2020035328, retrieved Mar. 4, 2024 (Year: 2024).*

(Continued)

*Primary Examiner* — Suezu Ellis
(74) *Attorney, Agent, or Firm* — Kim & Stewart LLP

(57) ABSTRACT

A transaction settlement device includes a processor that acquires a product code for an item being registered in a sales transaction in a customer operating mode, then checks whether the product code is associated with a sales restriction. A display screen then displays a clerk check screen when the product code has a sales restriction. The processor enters a clerk operating mode after the display of the clerk check screen for receiving a sales availability instruction and cancels registration of the acquired product code after the return to the customer operating mode when the sales availability instruction indicates purchase is not approved and permits the registration of the acquired product code after the return to the customer operating mode from the clerk operating mode when the sales availability instruction indicates purchase is approved.

20 Claims, 10 Drawing Sheets

(56) References Cited

U.S. PATENT DOCUMENTS

2022/0292935 A1* 9/2022 Nodera ................ B62B 5/0096
2022/0335483 A1* 10/2022 Tanabe ............... G07C 9/00563
2024/0403847 A1   12/2024 Sunder

OTHER PUBLICATIONS

Extended European Search Report dated Dec. 6, 2024, mailed in counterpart European Application No. 24182975.3, 8 pages.
Japanese Office Action dated Nov. 4, 2025, mailed in counterpart Japanese Application No. 2023-127283, 6 pages.

* cited by examiner

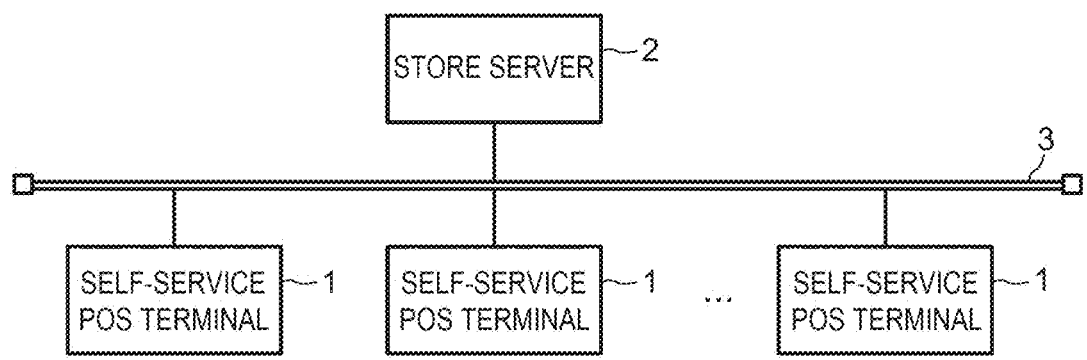
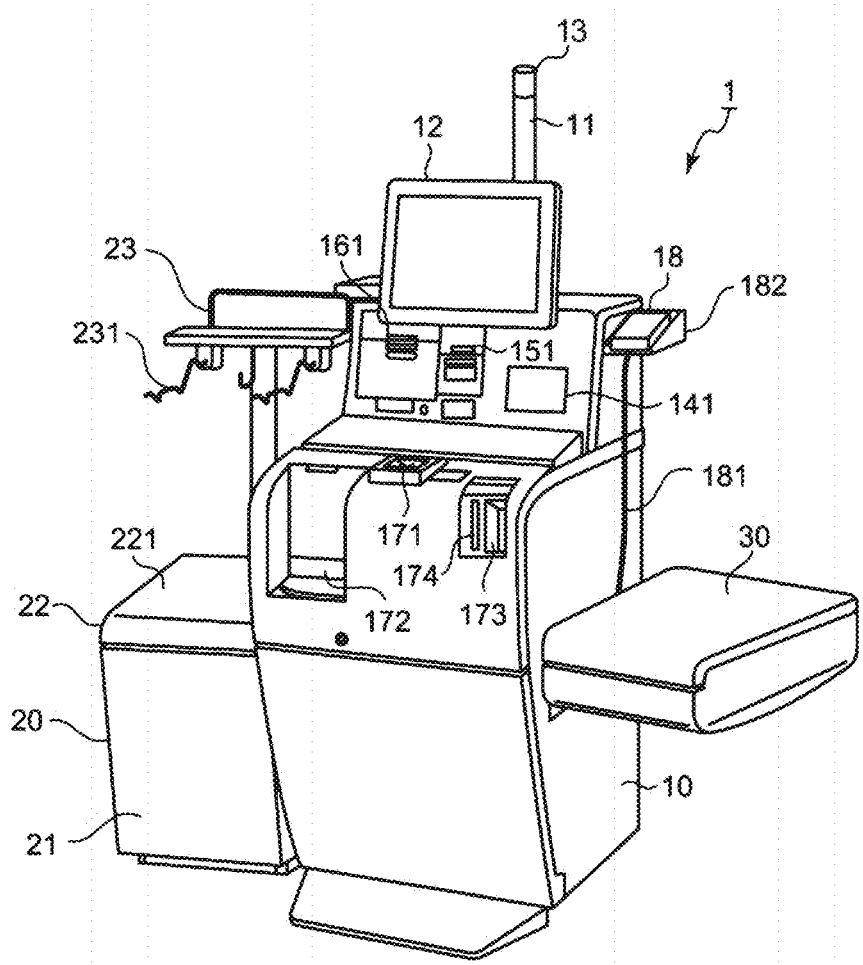

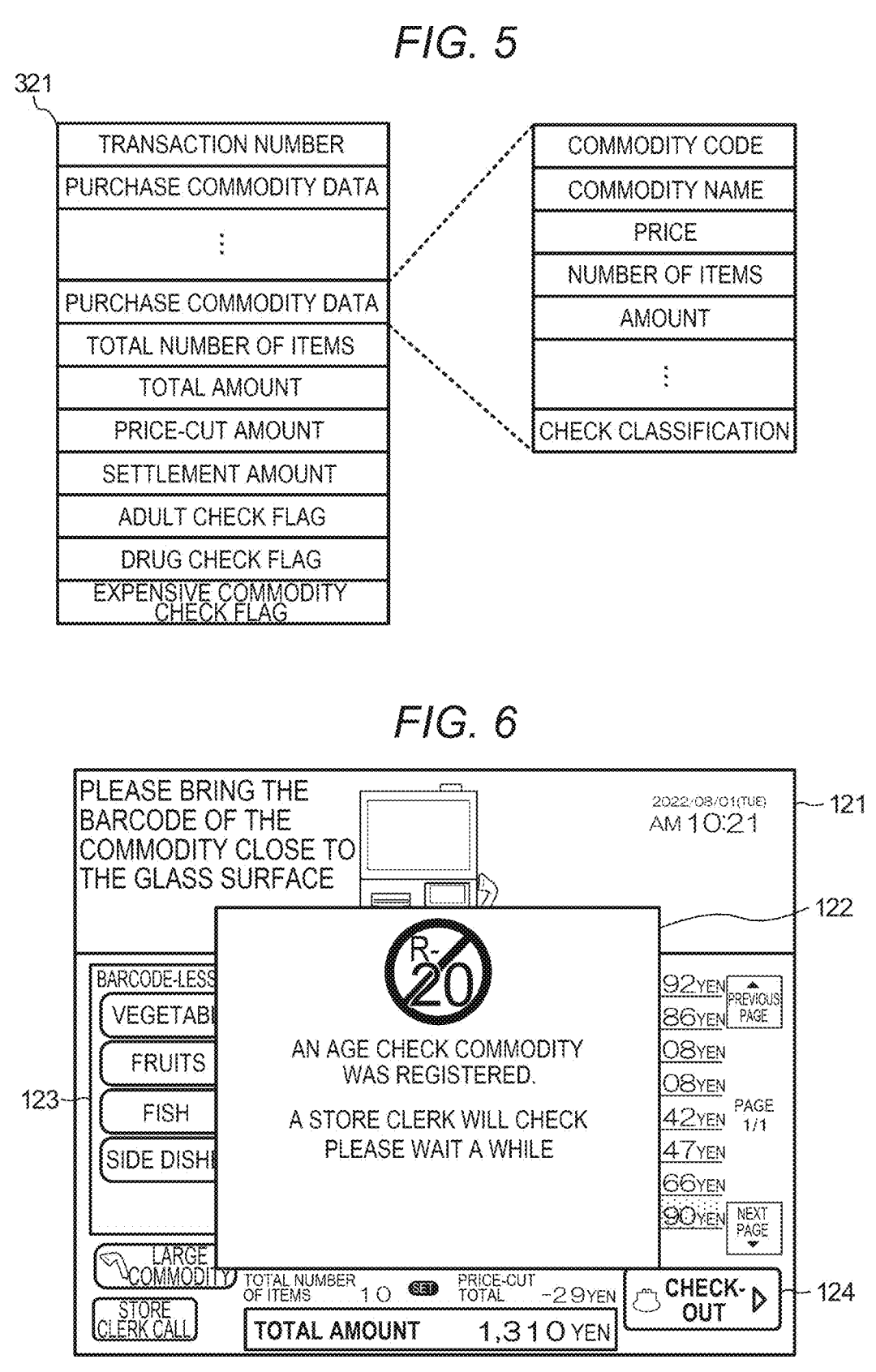

| TRANSACTION NUMBER |
| --- |
| PURCHASE COMMODITY DATA |
| ⋮ |
| PURCHASE COMMODITY DATA |
| TOTAL NUMBER OF ITEMS |
| TOTAL AMOUNT |
| PRICE-CUT AMOUNT |
| SETTLEMENT AMOUNT |
| ADULT CHECK FLAG |
| DRUG CHECK FLAG |
| EXPENSIVE COMMODITY CHECK FLAG |

| COMMODITY CODE |
| --- |
| COMMODITY NAME |
| PRICE |
| NUMBER OF ITEMS |
| AMOUNT |
| ⋮ |
| CHECK CLASSIFICATION |

FIG. 6

PLEASE BRING THE BARCODE OF THE COMMODITY CLOSE TO THE GLASS SURFACE

2022/08/01(TUE) AM 10:21 — 121

— 122

BARCODE-LESS
- VEGETABLE
- FRUITS
- FISH
- SIDE DISH

123 —

R-20

AN AGE CHECK COMMODITY WAS REGISTERED.

A STORE CLERK WILL CHECK
PLEASE WAIT A WHILE

92 YEN  ▲ PREVIOUS PAGE
86 YEN
08 YEN
08 YEN
42 YEN   PAGE 1/1
47 YEN
66 YEN
90 YEN  NEXT PAGE ▼

LARGE COMMODITY
STORE CLERK CALL

TOTAL NUMBER OF ITEMS 10    PRICE-CUT TOTAL -29 YEN
TOTAL AMOUNT   1,310 YEN

CHECK-OUT ▷ — 124

TRANSACTION SETTLEMENT DEVICE THAT SWITCHES BETWEEN CLERK AND CUSTOMER OPERATING MODES FOR CANCELING OR PERMITTING REGISTRATION OF PRODUCTS

CROSS-REFERENCE TO RELATED APPLICATION

This application is based upon and claims the benefit of priority from Japanese Patent Application No. 2023-127283, filed Aug. 3, 2023, the entire contents of which are incorporated herein by reference.

FIELD

Embodiments described herein relate to a settlement device for retail transactions and the like.

BACKGROUND

In retail stores, settlement systems for use in a full self-service scheme have been proposed. In a full self-service scheme, a customer performs registration and settlement (payment) for purchased commodities by himself or herself. In a store in which a full self-service scheme has been introduced, a settlement device, a so-called self-service point-of-sale (POS) terminal, may be used.

In some instances, certain items for sale at the store may require a check or confirmation by a store clerk. For example, an age limit is set for cigarettes and liquor, and such items can be sold only after the store clerk checks the age of a purchasing customer. In some cases, specific drugs or items requiring a medical certificate or a prescription from a doctor may be sold at the store. Such drugs or items may have to be checked by a store clerk having a particular qualification or training related to prescription drugs or medical-related items and the like. Furthermore, for some stores, there may be items (commodities) which are set by store management as requiring pre-sale check for such things as sales eligibility, product availability, or purchase confirmation/control, such as expensive commodities.

Therefore, in the settlement system for the full self-service scheme in which commodities are registered by a customer, it may still be required that a store clerk perform a pre-sale check in a secure manner.

BRIEF DESCRIPTION OF THE DRAWINGS

FIG. 1 depicts a schematic configuration of a full self-service scheme including a self-service POS terminal according to a first embodiment.

FIG. 2 is a perspective view illustrating an exterior configuration of a self-service POS terminal.

FIG. 5 is a schematic diagram illustrating a data structure of a transaction file.

FIG. 6 depicts a check screen without buttons as popup-displayed on a commodity registration screen.

DETAILED DESCRIPTION

Figure 3:
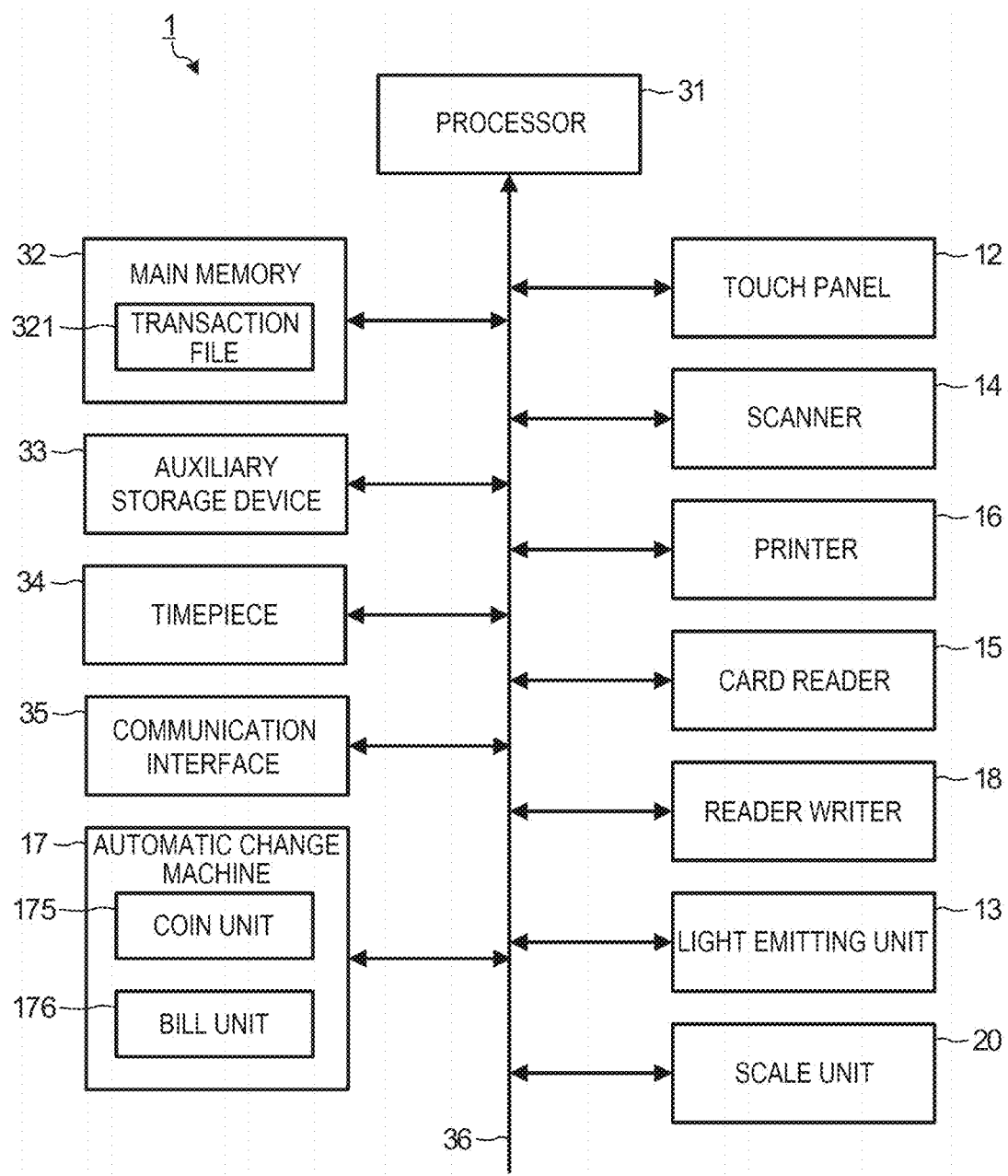
FIG. 3 is a block diagram of a self-service POS terminal.

A settlement system for a full self-service scheme according to an embodiment provides an improved settlement device by which a store clerk check for the purchase of a restricted target commodity can be securely and certainly performed.

According to one embodiment, a transaction settlement device includes a processor. The processor is configured to: acquire a product code for an item being registered in a sales transaction in a customer operating mode; check whether the product code is associated with a sales restriction; cause a display screen to display a clerk check screen whenever the product code is associated with the sales restriction; enter a clerk operating mode after the display of the clerk check screen; receive a sales availability instruction for the item corresponding to the acquired product code while in the clerk operating mode; cancel a registration of the acquired product code in the sales transaction after the return to the customer operating mode from the clerk operating mode when the sales availability instruction indicates purchase is not approved; and permit the registration of the acquired product code in the sales transaction after the return to the customer operating mode from the clerk operating mode when the sales availability instruction indicates purchase is approved.

Certain example embodiments of a settlement device are explained below with reference to the accompanying drawings.

First Embodiment

In this first embodiment, a settlement device for a full self-service system is explained. In the following, such a settlement device can be referred to as self-service POS terminal.

FIG. 1 depicts a settlement system including a plurality of self-service POS terminals 1 and a store server 2. The self-service POS terminals 1 and the store server 2 are connected by a communication network 3, such as a LAN (Local Area Network). The store server 2 provides various services relating to the settlement system to the self-service POS terminals 1 via the communication network 3.

The self-service POS terminals 1 are installed in checkout places of a store. Customers who finished shopping (collecting goods for purchase) are the operators of self-service POS terminals 1. A customer selects then puts a commodity for purchase (purchase commodity) in a shopping basket or a shopping cart while on a selling floor where commodities (items) are displayed for sale. The customer then moves to the checkout place, and begins to operate a self-service POS terminal 1 to perform checkout processing. In this context, checkout processing includes item registration and payment for the registered items (transaction payment). In this self-service system, the transaction from registration to payment is substantially handled by the customer by himself or herself. The self-service POS terminal 1 is an example of a settlement device adapted to a full self-service. The settlement device can also be referred to as settlement terminal, checkout device, checkout terminal, commodity registration device, commodity registration terminal, and the like.

FIG. 2 is a perspective view illustrating an exterior configuration of the self-service POS terminal 1. FIG. 3 is a block diagram of the self-service POS terminal 1.

As illustrated in FIG. 2, the self-service POS terminal 1 includes a main body 10 installed on a floor surface and a scale unit 20 installed beside the main body 10. A display pole 11 and a touch panel 12 are attached to an upper part of the main body 10. In the main body 10, a basket table 30 is provided on the opposite side from the scale unit 20. The basket table 30 is a platform for a customer to place a basket or the like or put purchase commodities (items to be registered). The customer performs work standing such that the customer can see a screen of the touch panel 12. As viewed from the customer's perspective, the basket table 30 is on the right side and the scale unit 20 is on the left side with the main body 10 in between. In the following explanation, the side where the customer stands is referred to as the front of the main body 10, the side where the scale unit 20 is installed is referred to as the left side of the main body 10, and the side where the basket table 30 is provided is referred to as the right side of the main body 10.

The display pole 11 includes, at the distal end portion thereof, a light emitting unit 13 that selectively emits, for example, blue light and red light. The display pole 11 displays, according to the light emission color of the light emitting unit 13, a present state of the self-service POS terminal 1. For example, the state of the service POS terminal 1 may be a standby state, operating (in use) state, a calling (clerk request) state, or an error state.

The touch panel 12 includes a display for displaying various screens to an operator (e.g., customer) and a touch sensor for detecting the touch inputs by the operator on the display. In the self-service POS terminal 1, the operator is usually a customer.

A reading window 141 (for a scanner 14 (see FIG. 3)), a card insertion port 151 (for a card reader 15 (see FIG. 3)), and a dispensing port 161 for a receipt (from a printer 16 (see FIG. 3)) are formed on the front surface of the main body 10. A coin depositing port 171, a coin dispensing port 172, a bill depositing port 173, and a bill dispensing port 174 for an automatic change machine 17 (see FIG. 3) are also formed on the front surface of the main body 10. Further, a communication cable 181 extends from the right side surface to the outside of the main body 10. A reader-writer 18 for an electronic money medium is connected to the distal end of the communication cable 181. The reader-writer 18 is placed on a placing table 182 provided on a right side surface upper part of the main body 10.

The scale unit 20 has structure in which a scale pan 22 is provided on an upper part of a housing 21 and a bag holder 23 is attached to an upper part of the scale pan 22. The upper surface of the scale pan 22 is a placing surface 221. The bag holder 23 includes a pair of holding arms 231. A register bag or a reusable shopping bag carried by a customer can be held by the holding arms 231. The scale unit 20 measures the weight of commodities put in a register bag or a reusable shopping bag held by the holding arms 231 or placed on the placing surface 221.

As illustrated in FIG. 3, the self-service POS terminal 1 includes a processor 31, a main memory 32, an auxiliary storage device 33, a timepiece 34, a communication interface 35, a touch panel 12, a light emitting unit 13, a scanner 14, a card reader 15, a printer 16, an automatic change machine 17, a reader-writer 18, a scale unit 20, and a system transmission line 36. The system transmission line 36 includes an address bus, a data bus, and a control signal line. The system transmission line 36 connects the processor 31 and the other units directly or via a signal input and output (I/O) circuit and transmits data signals exchanged between the processor 31 and the other units.

The processor 31 controls each of the units according to an operating system and/or application programs in order to implement various functions of the self-service POS terminal 1. The processor 31 is, for example, a CPU (Central Processing Unit). In other examples, processor 31 may be an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array). Alternatively, the processor 31 may be a combination of any of the foregoing.

The main memory 32 includes a nonvolatile memory region and a volatile memory region. The main memory 32 stores an operating system or application programs in the nonvolatile memory region. The main memory 32 sometimes stores, in the nonvolatile or volatile memory region, data necessary for the processor 31 in executing processing for controlling each of the units. For example, the main memory 32 stores a transaction file 321. The transaction file 321 is a data file for storing data relating to one commercial transaction processed by the self-service POS terminal 1. Details of the transaction file 321 are explained below. The main memory 32 uses the volatile memory region as a work area where data is rewritten as appropriate by the processor 31. The nonvolatile memory region is, for example, a ROM (Read Only Memory). The volatile memory region is, for example, a RAM (Random Access Memory).

For example, an EEPROM (Electric Erasable Programmable Read-Only Memory), an HDD (Hard Disc Drive), an SSD (Solid-State Drive), or the like can be the auxiliary storage device 33. The auxiliary storage device 33 stores data to be used by the processor 31 in performing various kinds of processing, data created by the processing in the processor 31, and the like. The auxiliary storage device 33 sometimes stores the application programs described above.

The timepiece 34 (clock) tracks time. The processor 31 processes, as present time, the time tracked by the timepiece 34.

The communication interface 35 performs, according to a preset communication protocol, data communication with external equipment connected via a network. The external equipment is, for example, the store server 2, a router, or another self-service POS terminal 1.

The scanner 14 reads a code symbol from a commodity that is held over the reading window 141. Code symbols obtained by encoding commodity IDs or the like for identifying commodities sold in the store are placed on the commodities. The code symbols are, for example, barcodes. The code symbols may be, for example, two-dimensional data codes. The scanner 14 may be a type for reading the code symbols by scanning laser light or may be a type for reading the code symbols from an image captured by an imaging device.

The card reader 15 reads card data recorded in a card medium such as a credit card or a point card. The card reader 15 draws, into the main body 10, the card medium inserted into the card insertion port 151, reads the card data, and thereafter discharges the card medium from the card insertion port 151.

The printer 16 prints receipt data or the like representing content of a commercial transaction on receipt paper. The receipt paper on which the receipt data is printed is discharged from the dispensing port 161, after being cut by a cutter.

The automatic change machine 17 includes a coin unit 175 and a bill unit 176. The coin unit 175 sorts, one by one, coins deposited into the coin depositing port 171, identifies denominations, and stores the coins in a safe for each of the denominations. The coin unit 175 takes out coins of relevant denominations from the safe based on, for example, change data and dispenses the coins to the coin dispensing port 172. The bill unit 176 sorts, one by one, bills deposited into the bill depositing port 173 and stores the bills in a safe for each of denominations. The bill unit 176 takes out bills of relevant denominations from the safe based on, for example, change data and dispenses the bills to the bill dispensing port 174.

The reader-writer 18 reads and rewrites electronic money information recorded in an electronic money medium. The electronic money medium is, for example, a noncontact IC card. In some examples, the electronic money medium may be electronic equipment such as a smartphone or a tablet terminal storying or otherwise providing electronic money information.

An operation of the self-service POS terminal 1 is explained below.

Like the settlement device of the related art, the self-service POS terminal 1 in this first embodiment is capable of operating in two operation modes (a self-service mode referred to here as a first operation mode and a store clerk mode referred to here as a second operation mode). For example, if a store clerk barcode printed on a card medium or the like is read by the scanner 14, the self-service POS terminal 1 shifts from the self-service mode to the store clerk mode. In the store clerk mode, check options related to store clerk checks of a check target commodity registered in the self-service mode can be selected.

As the check options in the self-service mode, the self-service POS terminal 1 in this first embodiment has the following four selectable options.

Option 1: Permit registration of the check target commodity. When the option 1 is selected, check by the store clerk is made unnecessary and all registrations are permitted. That is, the store clerk does not need to intervene.

Option 2: Not permit registration of the check target commodity (require a call to the store clerk every time). In the option 2, checks by a store clerk are necessary for every registration of a check target commodity.

Option 3: Not permit registration of the check target commodity (require a call the store clerk only for a first check target commodity item). In the option 3, check by store clerk intervention is necessary only for registration of the first item that is a check target commodity type.

Option 4: Not permit registration of the check target commodity (require a call to the store clerk upon the pressing of a checkout (complete transaction) button). In the option 4, check by store clerk intervention is necessary at the checkout time after commodity registration is completed but before payment. Note that the checkout button is a button disposed on a commodity registration screen indicating a registration status of a purchase commodity displayed on the touch panel 12, the button is operated when intending to proceed to settlement (payment) after registration of all purchase commodities is finished.

Figure 4:
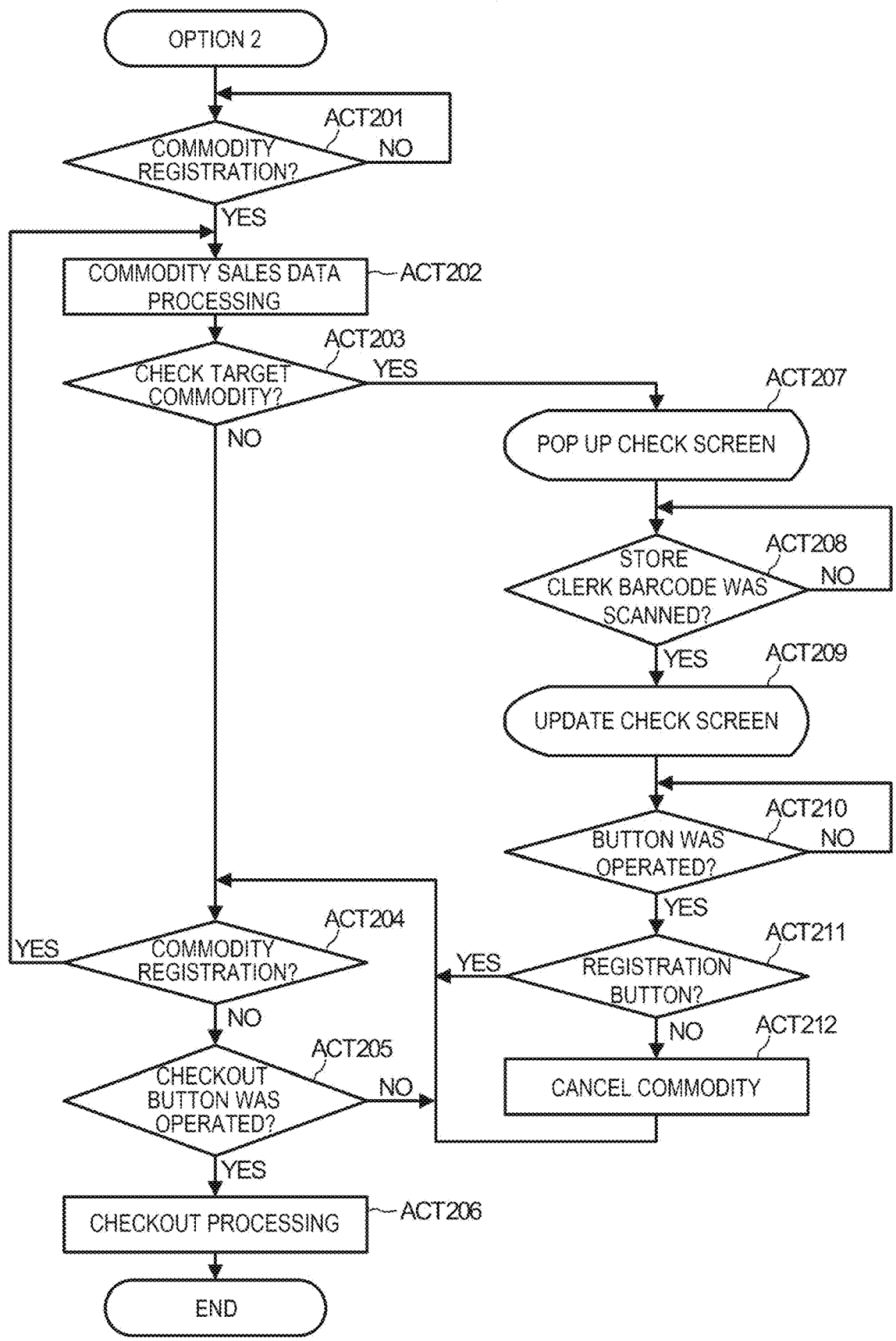
FIG. 4 is a flowchart of information processing executed by a processor of a self-service POS terminal in a self-service mode.
Figure 7:
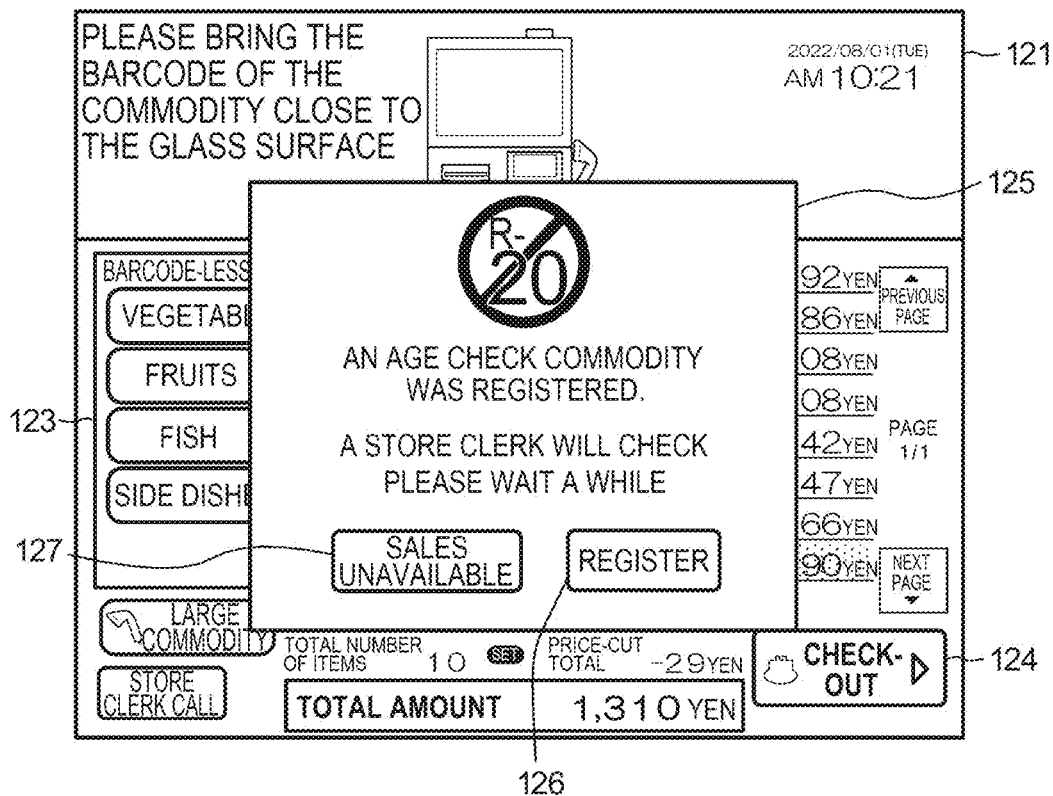
FIG. 7 is a schematic diagram illustrating an example of a check screen with buttons as popup-displayed on a commodity registration screen.
Figure 8:
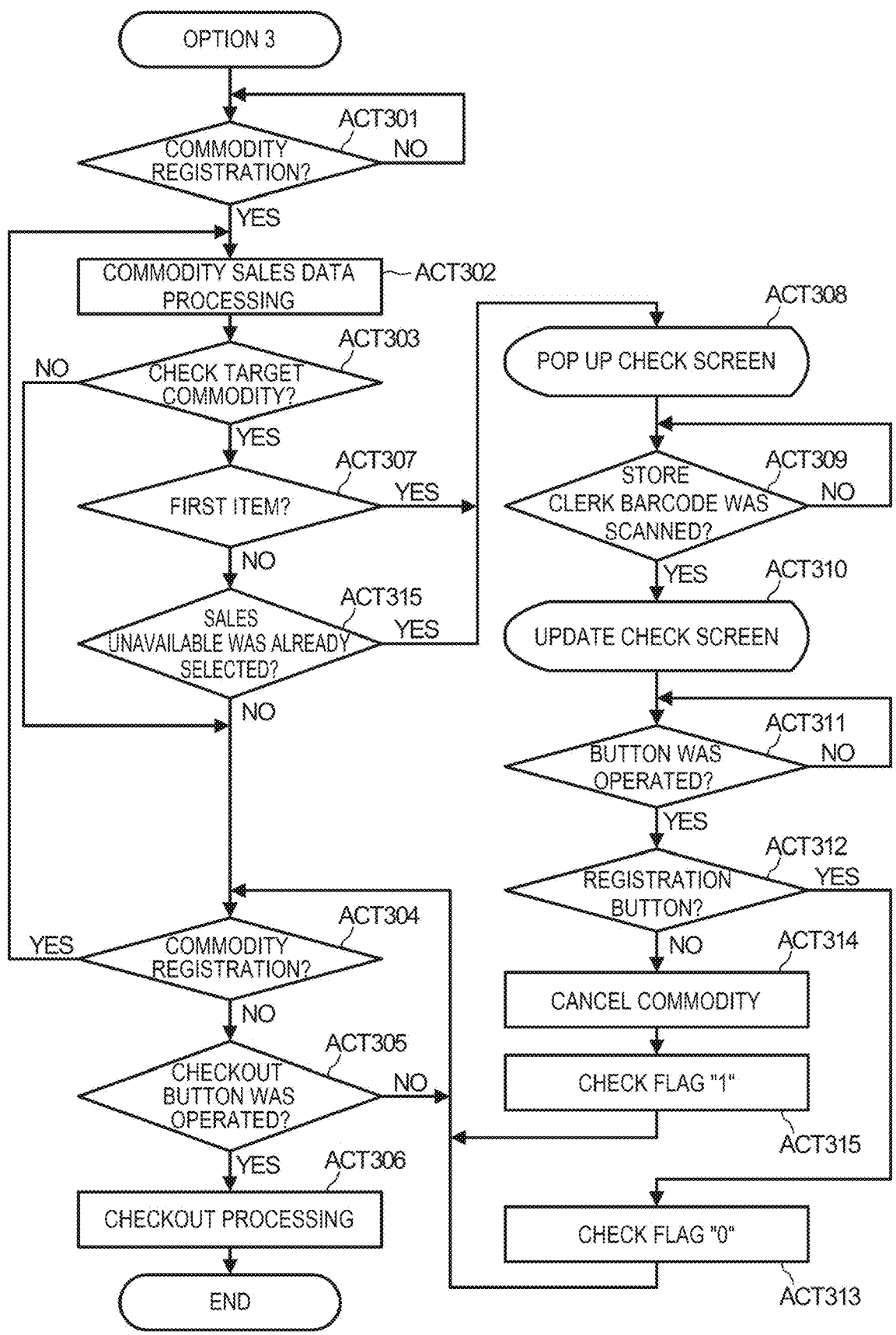
FIG. 8 is a flowchart of information processing executed by a processor of a self-service POS terminal in a self-service mode.
Figure 9:
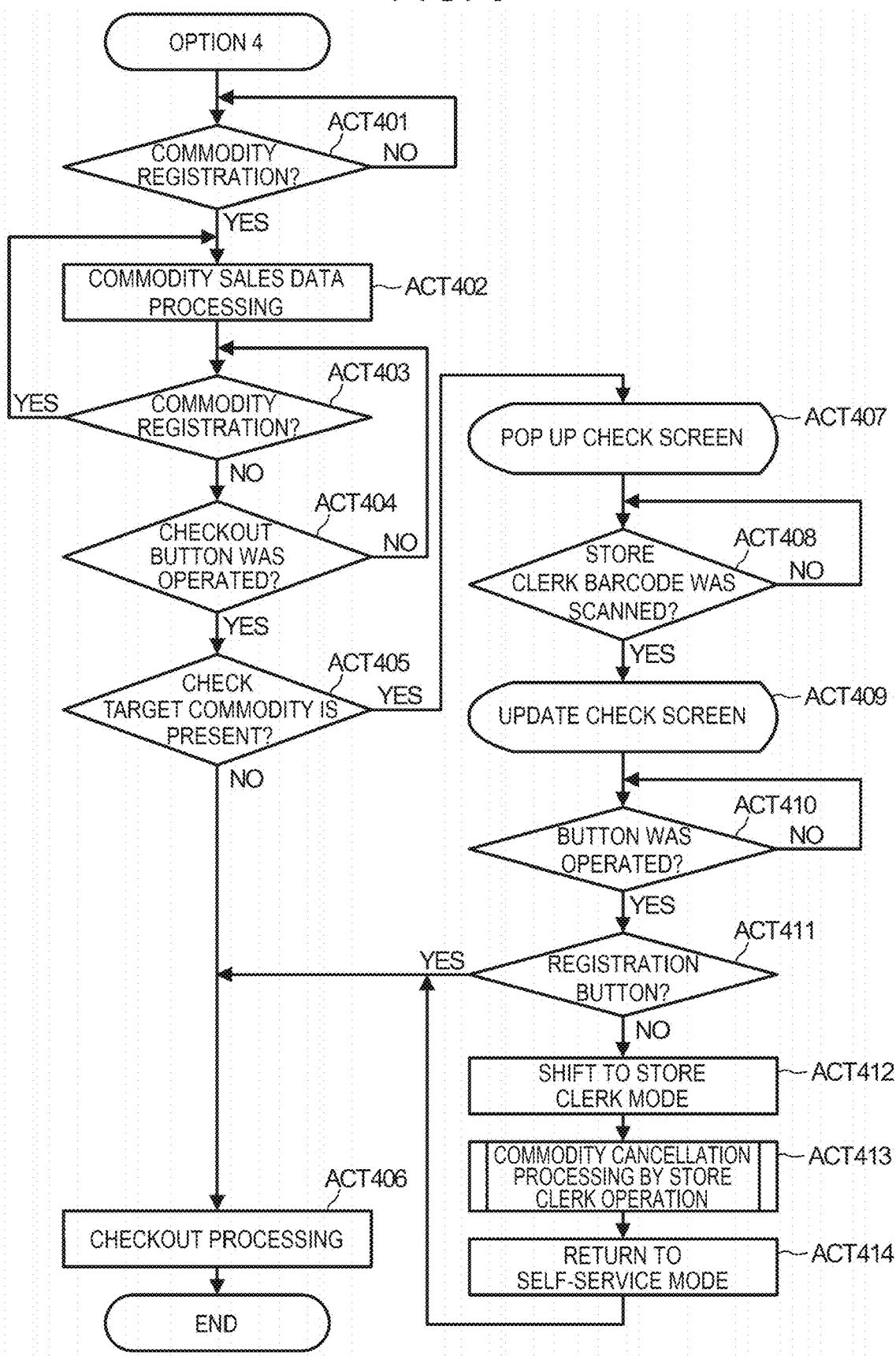
FIG. 9 is a flowchart of information processing executed by a processor of a self-service POS terminal in a self-service mode.

When the option 1 is selected, the store clerk check for the check target commodity is not performed/required. In the following explanation, operations of the self-service POS terminal 1 when the options 2, 3, and 4 are respectively selected are explained with reference to FIG. 4 to FIG. 9. FIG. 4 is a flowchart of information processing executed by the processor 31 of the self-service POS terminal 1 when option 2 is selected. FIG. 5 is a schematic diagram illustrating a main data structure stored in the transaction file 321. FIG. 6 is a schematic diagram illustrating an example of a check screen without buttons popup-displayed on the commodity registration screen displayed on the touch panel 12. FIG. 7 is a schematic diagram illustrating an example of a check screen with buttons popup-displayed on the commodity registration screen. FIG. 8 is a flowchart of information processing executed by the processor 31 when the option 3 is selected. FIG. 9 is a flowchart of information processing executed by the processor 31 when the option 4 is selected.

Note that the particular procedures illustrated by FIG. 4, FIG. 8, and FIG. 9 are explanatory examples. In general, the information processing procedures are not particularly limited so long as the same result can be obtained. The data structure illustrated by FIG. 5 is also an example. The format of the data structure is not particularly limited so long as the information necessary for the processor 31 can be obtained. Similarly, the screens illustrated by FIG. 6 and FIG. 7 are also examples. The format of the screens is not particularly limited so long as the information necessary for a user can be obtained.

(1) If the Option 2 is Selected

In this case, as illustrated in FIG. 4, in ACT 201, the processor 31 waits for commodity registration. First, a customer starts self-service registration using the self-service POS terminal 1, operates the touch panel 12 and inputs information necessary for the self-service registration. The information necessary for the self-service registration is, for example, information indicating whether a reusable shopping bag is used. After the information necessary for the self-service registration is input, the processor 31 sets the screen of the touch panel 12 to the commodity registration screen. The commodity registration screen is explained below.

The customer then picks up commodities one by one from a basket or the like on the basket table 30, holds the commodity over the reading window 141 of the scanner 14, permits the scanner 14 to read a code symbol, and then places the now-registered commodity on the placing surface 221 of the scale pan 22. Note that, for items such as perishables (e.g., fruits and vegetables) lacking a barcode or other code symbols thereon, the customer identifies the item being purchased by selection from a barcode-less commodity list displayed on the commodity registration screen of the touch panel 12 and then places the now-registered commodity on the placing surface 221.

With the self-service operation explained above, a commodity code of the purchase commodities is input to the self-service POS terminal 1. The processor 31 searches through a commodity data file with the commodity code and acquires commodity data corresponding to the commodity code. The commodity data file is stored in, for example, the auxiliary storage device 33. The commodity data file may be stored in the store server 2 in some examples. The processor 31 may transmit a commodity code to the store server 2 to acquire commodity data from the store server 2. The commodity data includes information such as a commodity name, a unit price, a tax class, a unit weight, and a check classification. The tax class is information for identifying, for example, whether the commodity is a tax inclusive commodity, a tax for which is included in the unit price or a tax exclusive commodity, a tax for which is not already included in the unit price. The unit weight is a standard (expected) weight for the commodity. The check classification is information indicating the necessity of a check by the store clerk and, if a check is necessary, the type of check. Types of checks can be a minor (age) check, a drug check (prescription verification), an expensive commodity check (loss control check), or the like.

The processor 31 calculates, according to weight data measured by the scale unit 20, weight of the commodity placed on the placing surface 221. The processor 31 determines whether the commodity weight is within an allowable range of the unit weight. If the commodity weight is within the allowable range, the processor 31 recognizes that the commodity registration was normally performed.

Note that, if the commodity weight is outside the allowable range, the processor 31 recognizes that the commodity registration is an error. In this case, the processor 31 causes the touch panel 12 to display an error message. Further, the processor 31 controls the light emitting unit 13 to be in a state indicating the error.

If recognizing that the commodity registration was normally performed, the processor 31 determines YES in ACT 201 and proceeds to ACT 202. In ACT 202, the processor 31 executes commodity sales data processing. That is, the processor 31 generates commodity sales data including a commodity code, a commodity name, a unit price, a tax class, a check classification, the number of sold items, and a sales amount for the purchase commodity. If a multiplier is input via the touch panel 12 before input of the commodity code, the number of sold items matches the multiplier. If a multiplier is not input, the number of sold items is "1" by default. The processor 31 registers the commodity sales data in the transaction file 321. The processor 31 causes the commodity registration screen of the touch panel 12 to display the commodity name, the sales amount, and the like of the commodity sales data.

In the transaction file 321, as illustrated in FIG. 5, data such as a transaction number, purchase commodity data, a total number of items, a total amount, a price-cut amount, a settlement amount, an adult check flag, a drug check flag, and an expensive commodity check flag are stored.

The transaction number is a serial number issued every time a commercial transaction is processed by the self-service POS terminal 1. The purchase commodity data is record data created for each of the commodities in the commercial transaction identified by the transaction number. Here, the purchase commodity data is configured with categories such as commodity code, commodity name, price, number of items, amount, and check classification. The number of items is the number of purchased items of a commodity type identified by the same commodity code. The amount is the amount due for the number of purchased items with the same commodity code. The check classification is information indicating the necessity and type of check by the store clerk. The transaction file 321 can store a plurality of purchase commodity data.

The total number of items is all the items in the transaction. The total amount is the amount due for all the items in the transaction and is obtained by totaling amounts in the respective purchase commodity data. The price-cut amount is an amount obtained by applying a price cut to the total amount. The settlement amount is an amount obtained by subtracting the price-cut amount from the total amount.

The adult check flag, the drug check flag, and the expensive commodity check flag are data indicating the result of a check by the store clerk for each of type of check as necessary. These flags are null in an initial state and may be set to "0" if the sale is permitted after the check by the store clerk and to "1" if the sale is not permitted after the check. For example, if the store clerk confirms that a customer is a minor, the adult check flag is set to "1" and sales of cigarettes and liquor is prohibited. These flags are information used in the option 3.

In ACT 203, whether a registered purchase commodity is a check target commodity is checked. Specifically, the processor 31 checks whether some type of check is stored as a check classification in purchase commodity data of a purchase commodity just registered anew in the transaction file 321.

If the purchase commodity is not a check target commodity, the processor 31 determines NO in ACT 203 and proceeds to ACT 204. In ACT 204, the processor 31 checks whether the next commodity registration has been performed. If another commodity registration was not performed, the processor 31 determines NO in ACT 204 and proceeds to ACT 205. In ACT 205, the processor 31 checks whether a checkout button was pressed. The checkout button is displayed on, for example, the touch panel 12. If the checkout button was not pressed, the processor 31 determines NO in ACT 205 and returns to ACT 204. Here, in ACT 204 and ACT 205, the processor 31 waits for another commodity registration to be performed or the checkout button to be pressed.

If detecting that commodity registration was performed in the waiting state in ACT 204 and ACT 205, the processor 31 determines YES in ACT 204 and returns to ACT 202. That is, the processor 31 executes the commodity sales data processing as explained above. Therefore, commodity sales data of each of commodities registered by the customer with the self-service operation is eventually stored in the transaction file.

If detecting that the checkout button was pressed, the processor 31 determines YES in ACT 205 and proceeds to ACT 206. In ACT 206, the processor 31 executes checkout processing.

In the checkout processing, the processor 31 acquires information relating to settlement of the transaction. The information relating to settlement of a transaction includes the commodity sales data stored in the transaction file, a transaction date and time, a register number, a store number, a transaction number, and store data. The transaction date and time is a date and time tracked by the timepiece 34. The register number is a terminal identification set uniquely for each of the self-service POS terminals 1. The store number is a store identification set for each store where the self-service POS terminals 1 are installed. The transaction number is a transaction identification issued every time a transaction is settled. The store data can be a store name, an address, a store telephone number, or the like.

In checkout processing, processor 31 causes the touch panel 12 to display a payment method selection screen. The payment method selection screen is a screen permitting the customer to select a payment method. After a payment method is selected by the customer, the processor 31 switches the screen of the touch panel 12 from the payment method selection screen to a checkout screen corresponding to the selected payment method. On the checkout screen, a total amount is displayed and, if cash payment is performed, a deposited amount, a change due amount, and the like are displayed, and an adjustment button for the customer to instruct settlement of a transaction by the selected payment method is displayed. The processor 31 executes settlement processing corresponding to the selected payment method after operation of the adjustment button by the customer. For example, if cash payment is selected, the processor 31 executes settlement processing by the cash payment. If credit card payment is selected, the processor 31 executes settlement processing by the credit card payment. If electronic money payment is selected, the processor 31 executes settlement processing by the electronic money payment. The same applies if any other payment methods are available and selected. Note that, since these kinds of settlement processing are well-known processing, detailed explanation of the settlement processing is omitted here.

Upon ending the settlement processing, the processor 31 controls the printer 16 and dispenses a receipt. The processor 31 also may transmit the transaction file 321 to the store server 2 through the communication network 3 to accumulate the transaction files 321 in the store server 2 for recordkeeping and to permit the transaction file 321 to be cleared from the main memory 32.

The basic procedure of the information processing explained above is performed if purchase of a checkout target commodity is absent from the transaction. In contrast, if a checkout target commodity is present, a procedure of information processing explained below is performed.

That is, if a purchased commodity is a check target commodity, the processor 31 determines YES in ACT 203 and proceeds to ACT 207. In ACT 207, the processor 31 popup-displays a check screen without buttons (no button check screen) on the commodity registration screen displayed on the touch panel 12. Further, the processor 31 controls the light emitting unit 13 to be in a state indicating that the check target commodity has been registered and a check by the store clerk is necessary.

If a check target commodity is registered, a check screen without buttons 122 is popup-displayed on a commodity registration screen 121, as illustrated in FIG. 6. FIG. 6 is an example of a case in which an age check target commodity age-limited to 20 years or older such as liquor is registered. Only a message is displayed on the check screen without buttons 122 and no operation button is included in the check screen without buttons 122. Since a barcode-less commodity list 123 and operation buttons such as a checkout button 124 disposed on the commodity registration screen 121 are the background of the check screen without buttons 122, even if the barcode-less commodity list 123 and the operation buttons are touched, input of the barcode-less commodity list 123 and the operation buttons is not received or acted upon. In other words, when the check screen without buttons 122 is being displayed, the processor 31 prohibits further operations by the customer.

After the check screen without buttons 122 has been displayed as explained above, the processor 31 waits, in ACT 208, for a store clerk barcode to be scanned. The store clerk, seeing the light emitting unit 13 in a state indicating that a check by the store clerk is necessary, rushes to the self-service POS terminal 1, reads the message presented on the check screen without buttons 122 that is displayed on the touch panel 12, and carries out necessary measures. In an example of the check screen without buttons 122 illustrated in FIG. 6, the age of the customer is checked. The store clerk holds a store clerk barcode, which is printed on a card medium or the like carried by the store clerk, over the reading window 141 of the scanner 14 and causes the scanner 14 to read the store clerk barcode.

After the store clerk barcode is scanned, the processor 31 determines YES in ACT 208 and proceeds to ACT 209. In ACT 209, the processor 31 updates the check screen without buttons 122 to a check screen with buttons. Further, the processor 31 controls the light emitting unit 13 to release the state indicating that the check by the store clerk is necessary.

After the store clerk barcode is scanned, the check screen on the commodity registration screen 121 displayed on the touch panel 12 is updated from the check screen without buttons 122 to a check screen with buttons 125, as illustrated in FIG. 7. The check screen with buttons 125 includes a registration button 126 for permitting sales and a sales unavailable button 127 for prohibiting sales.

Accordingly, in ACT 210, the processor 31 waits for operation of a button on the check screen with buttons 125. If the registration button 126 or the sale unavailable button 127 of the check screen with buttons 125 is operated, the processor 31 determines YES in ACT 210 and proceeds to ACT 211. Note that the store clerk may perform or the customer may perform the button pressing operation itself.

In ACT 211, the processor 31 checks whether the operated button was the registration button 126. If so, the processor 31 determines YES in ACT 211 and proceeds to ACT 204. That is, the processor 31 regards that the registration of the check target commodity was approved, maintains the registration of the commodity, and becomes capable of receiving registration of the next commodity.

In contrast, if the sales unavailable button 127 was operated, the processor 31 determines NO in ACT 211 and proceeds to ACT 212. In ACT 212, the processor 31 cancels the registration of the check target commodity. That is, the processor 31 deletes, from the transaction file 321, corresponding purchase commodity data from the transaction file 321 and recalculates a total number of items, a total amount, and the like and updates content of the transaction file 321. In this way, the processor 31 automatically cancels, while staying the self-service mode, the registration of the check target commodity that was determined as sales unavailable by the store clerk. Thereafter, the processor 31 proceeds to ACT 204 and becomes capable of receiving registration of the next purchase commodity.

Note that the store clerk will generally collect the cancelled check target commodity if a sale is not allowed. If the same type of check target commodity is recognized as present in a basket or on the basket table 30, the store clerk may also collect these items as well at this time. If the store clerk notices that a check target commodity of another check classification type is present in the basket or the like, the store clerk may go ahead and immediately carrying out the check operation for the check target commodity by asking the customer to perform the commodity registration operation for these other check target commodity items.

As explained above, when the option 2 is selected in the self-service mode, the store clerk will be called every time a check target commodity is registered. With the settlement device of the related art, cancellation of the unapproved registered commodity needs to be performed in the store clerk mode by a store clerk operation. In contrast, with the self-service POS terminal 1 in this first embodiment, cancellation of the unapproved registered commodity is carried out in the self-service mode without requiring an additional operation to be performed in the store clerk mode by the store clerk.

(2) If the Option 3 is Selected

In this case, as illustrated in FIG. 8, in ACT 301, the processor 31 waits for commodity registration. This is the same as ACT 201 in the option 2.

If recognizing that commodity registration was normally performed, the processor 31 determines YES in ACT 301 and proceeds to ACT 302. In ACT 302, the processor 31 executes commodity sales data processing. This is the same as ACT 202 in the option 2.

In ACT 303, the processor 31 checks whether the registered purchase commodity is a check target commodity. This is the same as ACT 203 in the option 2. If the purchase commodity is not a check target commodity, the processor 31 determines NO in ACT 303 and proceeds to ACT 304.

In ACT 304, the processor 31 checks whether the next commodity registration has been performed. This is the same as ACT 204 in the option 2. If another commodity registration was not performed, the processor 31 determines NO in ACT 304 and proceeds to ACT 305. In ACT 305, the processor 31 checks whether the checkout button 124 was pressed. This is the same as ACT 205 in the option 2. If the checkout button 124 was not pressed, the processor 31 determines NO in ACT 305 and returns to ACT 304. Here, in ACT 304 and ACT 305, the processor 31 waits for another commodity registration to be performed or the checkout button 124 to be pressed.

If detecting that commodity registration was performed in the waiting state in ACT 304 and ACT 305, the processor 31 determines YES in ACT 304 and returns to ACT 302. If detecting that the checkout button 124 was pressed in the waiting state in ACT 304 and ACT 305, the processor 31 determines YES in ACT 305 and proceeds to ACT 306. In ACT 306, the processor 31 executes checkout processing. This is the same as ACT 206 in the option 2.

If no check target commodity is registered, the procedure of information processing is the same as the procedure of the information processing in the option 2 for the same circumstance. In contrast, if a check target commodity is registered, the procedure of information processing explained below is performed.

That is, if the registered commodity is a check target commodity, the processor 31 determines YES in ACT 303 and proceeds to ACT 307. In ACT 307, the processor 31 determines whether the type of the check target commodity is checked for a first item type. In other words, the processor 31 determines whether a check by the store clerk has or has not already been performed for the same type of check target commodity. Specifically, the processor 31 checks whether "0" or "1" is set in a check flag for the relevant check type. That is, if the check flag is null (empty, not "0" or "1") in the check result for the type in the transaction file 321.

If the check flag has not been set, the processor 31 determines YES in ACT 307 and proceeds to ACT 308. In ACT 308, the processor 31 popup-displays the check screen without buttons on the commodity registration screen displayed on the touch panel 12.

After the check screen without buttons 122 has been displayed, the processor 31, in ACT 309, waits for a store clerk barcode to be scanned.

After the store clerk barcode has been scanned, the processor 31 determines YES in ACT 309 and proceeds to ACT 310. In ACT 310, the processor 31 updates the check screen without buttons 122 to the check screen with buttons 125. This is the same as ACT 209 in the option 2.

In ACT 311, the processor 31 waits for operation of a button on the check screen with buttons 125. This is the same as ACT 210 in the option 2.

After a button on the check screen with buttons 125 was operated, the processor 31 checks, in ACT 312, whether the operated button is the registration button 126. This is the same as ACT 211 in the option 2.

If the registration button 126 has been operated, the processor 31 determines YES in ACT 312 and proceeds to ACT 313. In ACT 313, the processor 31 sets "0" in a check flag for the relevant type of the check of the transaction file 321. After the check flag is set, the processor 31 proceeds to ACT 304.

In contrast, if the sales unavailable button 127 was operated, the processor 31 determines NO in ACT 312 and proceeds to ACT 314. In ACT 314, the processor 31 cancels the registration of the check target commodity. This is the same as ACT 212 in the option 2.

When cancelling the registration of the check target commodity determined as sales unavailable in the self-service mode, in ACT 315, the processor 31 sets "1" in the check flag for the relevant type of the check of the check file 321. After the check flag is set, the processor 31 proceeds to ACT 304.

If a type of the check target commodity is not checked for a first type item, that is, a type of check target commodity that was already checked by the store clerk and "0" or "1" is set in the check flag in the transaction file 321 for the relevant type of the check, the processor 31 determines NO in ACT 307 and proceeds to ACT 315. In ACT 315, the processor 31 checks whether the type of the check of the check target commodity has been determined as sales unavailable. The check can be performed by checking, in a check result for each type of the transaction file 321, whether "1" is set in the check flag for the relevant type of the check.

If "0" is set in the relevant check flag, the processor 31 determines NO in ACT 315 and proceeds to ACT 304. That is, if the check of the store clerk has been performed for the relevant type of the check and sales is permitted, the processor 31 maintains the registration of the check target commodity and receives registration of the next purchase commodity or operation of the checkout button 124.

If "1" is set in the relevant check flag, the processor 31 determines YES in ACT 315 and proceeds to ACT 308. That is, if the check of the store clerk has been performed for the relevant type of the check and sales is prohibited, the processor 31 receives the check of the store clerk again if the same commodity is registered again or if a check target commodity that is another commodity of the same check type is registered.

With the self-service POS terminal 1 in this first embodiment, in the option 3, as in the option 2, it is possible to carry out cancellation of the registered commodity while maintaining the self-service mode without performing the cancellation in the store clerk mode by store clerk operation.

Further, in the option 3, for a commodity of a type already confirmed by the store clerk as sales available, it is possible to proceed with registration without requiring a check of a type already checked by a store clerk to be performed again.

In a settlement device of the related art, when a registration cancellation of a check target commodity is performed in the store clerk mode by store clerk operation, the appropriate sales check is assumed to have been completed if the settlement device returns to the self-service mode after the cancellation operation by the store clerk but the check result is not stored, as such when a following check target commodity is registered the previous check is not noted as already performed. That is, although the check screen is displayed at the time of registration of a first item (instance) of a check target type commodity, the check screen might not be displayed at the time of registration of a second item (instance) of the check target type commodity and the commodity might then be registered without the appropriate check/approval by the clerk. That is, when sales of the check target commodity should be unavailable according to a store clerk check, it is expected in the related art that the store clerk will collect and remove all the other target commodities or at least must continue to monitor the transaction by the particular customer. Therefore, a settlement device in the related art cannot cope with a commodity collection omission, commodities additionally carried in later, and the like. In contrast, in the self-service POS terminal 1 in this present embodiment, the check by the store clerk must be securely carried out every time a commodity of an already disapproved type is registered again in the transaction. Therefore, such issues with missed clerk collections or transaction monitoring does not occur.

(3) If the Option 4 is Selected

In this case, as illustrated in FIG. 9, in ACT 401, the processor 31 waits for a commodity registration. This is the same as ACT 201 in the option 2.

If commodity registration was normally performed, the processor 31 determines YES in ACT 401 and proceeds to ACT 402. In ACT 402, the processor 31 executes commodity sales data processing. This is the same as ACT 202 in the option 2.

After the commodity sales data processing, the processor 31, in ACT 403, checks whether another commodity registration has been performed. This is the same as ACT 204 in the option 2. If another commodity registration was not performed, the processor 31 determines NO in ACT 403 and proceeds to ACT 404. In ACT 404, the processor 31 checks whether the checkout button 124 has been pressed. This is the same as ACT 205 in the option 2. If the checkout button 124 was not pressed, the processor 31 determines NO in ACT 404 and returns to ACT 403. Here, in ACT 403 and ACT 404, the processor 31 waits for commodity registration to be performed or the checkout button 124 to be pressed.

Upon detecting that commodity registration was performed in the waiting state in ACT 403 and ACT 404, the processor 31 determines YES in ACT 403 and returns to ACT 402. Upon detecting that the checkout button 124 was pressed in the waiting state in ACT 403 and ACT 404, the processor 31 determines YES in ACT 404 and proceeds to ACT 405.

In ACT 405, the processor 31 checks whether a check target commodity is present among registered purchase commodities. Specifically, the processor 31 checks, one by one, purchase commodity data registered in the transaction file 321 to check whether a purchase commodity for which some type of check has been stored as a check classification.

If there is no check target commodity among the purchase commodities, the processor 31 determines NO in ACT 405 and proceeds to ACT 406. In ACT 406, the processor 31 executes checkout processing. This is the same as ACT 206 in the option 2.

In contrast, if a check target commodity is among the purchase commodities, the processor 31 determines YES in ACT 405 and proceeds to ACT 407. In this case, since the processor 31 does not proceed to the checkout processing in ACT 406, the payment method selection screen and the checkout screen are not displayed on the touch panel 12 and the commodity registration screen remains displayed. In ACT 407, the processor 31 popup-displays a check screen without buttons 122 on the commodity registration screen. This is the same as ACT 207 in the option 2.

After the check screen without buttons 122 was displayed in this way, the processor 31 waits, in ACT 408, for a store clerk barcode to be scanned. This is the same as ACT 208 in the option 2.

After the store clerk barcode is scanned, the processor 31 determines YES in ACT 408 and proceeds to ACT 409. In ACT 409, the processor 31 updates the check screen without buttons 122 to the check screen with buttons 125. This is the same as ACT 209 in the option 2.

In ACT 410, the processor 31 waits for operation of a button on the check screen with buttons 125. This is the same as ACT 210 in the option 2.

After a button on the check screen with buttons 125 has been operated, the processor 31 checks, in ACT 411, whether the operated button is the registration button 126. This is the same as ACT 211 in the option 2.

If the registration button 126 was operated, the processor 31 determines YES in ACT 411 and proceeds to ACT 406. That is, the processor 31 regards that sales of the check target commodity was approved and proceeds to checkout processing.

In contrast, if the sales unavailable button 127 was operated, the processor 31 determines NO in ACT 411 and proceeds to ACT 412. In ACT 412, the processor 31 shifts from the self-service mode to the store clerk mode.

After shifting to the store clerk mode, the processor 31, in ACT 413, executes cancellation processing for the check target commodity by store clerk operation in the store clerk mode. In this context, the check target commodity may be a previously registered commodity type or there may be check target commodities of a plurality of different types but in the same check classification. Therefore, in some instances, it may be difficult for the processor 31 to carry out automatic cancellation processing. Therefore, the processor 31 can receive a cancellation operation by the store clerk. The commodity cancellation processing by the store clerk operation in ACT 413 ends according to a predetermined store clerk operation (e.g., button selection or the like).

After the commodity cancellation processing by the store clerk operation ended, the processor 31, in ACT 414, returns from the store clerk mode to the self-service mode. The processor 31 proceeds to ACT 406.

As explained above, if the option 4 is selected in the self-service mode, the check for check target commodities is not checked during the commodity registration processing and, all commodities, even a check target commodity, can be registered at this time. However, in response to pressing of the checkout button 124 before settlement processing can start, a check of the registered commodities is performed to identify the presence of any check target commodity among the registered items. If a check target commodity is present, the store clerk is called at this time. In the settlement device of the related art, if measures were taken in the store clerk mode to perform some check processing before the checkout button 124 was pressed, the sales check was assumed to be completed. Therefore, in the settlement device of the related art, the check screen for the check target commodity is not displayed when the checkout button 124 is pressed and a check target commodity may be sold without an appropriate store clerk confirmation. In the self-service POS terminal 1 in this present embodiment, even if measures were taken in the store clerk mode in order to perform some processing before the checkout button 124 is pressed, the check by the store clerk must still be carried out, and such a defect in clerk checking will not occur.

As explained above, the self-service POS terminal 1, according to the first embodiment, is a settlement device capable of operating in a self-service mode and a clerk mode. If a check target commodity is registered in the self-service mode, the processor 31 of the self-service POS terminal 1 causes the touch panel 12 to display the check screen without buttons 122, which is the check screen for calling the store clerk, and then the check screen with buttons 125, which is the selection screen permitting the store clerk to select to allow or deny sales of the check target commodity.

As explained above, with the self-service POS terminal 1 in a full self-service checkout scheme in which the registration of a purchase commodity is performed by the customer, it is possible to call the store clerk whenever a check target commodity is input and cause the store clerk to select identify whether sale of the commodity is permitted. Therefore, it is possible to securely require performance of the appropriate check of the check target commodities by a store clerk.

When registration operation for a purchase commodity was performed by operation of the customer in the self-service mode, the processor 31 registers the purchase commodity in the transaction file 321. Therefore, the processor 31 performs registration of the purchase commodity by operation of the customer. If the options 2 and 3 of the self-service mode are selected, the processor 31 causes the touch panel 12 to display the check screen without buttons 122 when a check target commodity is registered by the customer.

Accordingly, with the self-service POS terminal 1 in the first embodiment, it is possible appropriately require performance of checks of check target commodities by the store clerk at the time of registration.

When the options 2 and 3 of the self-service mode are selected, the processor 31 cancels the registration of the check target commodity from the transaction file 321 according to operation of the sales unavailable button 127 by the store clerk on the check screen with buttons 125. Therefore, the processor 31 performs cancellation of the registration of the purchase commodity, according to selection of sales unavailability (sale denial) by the store clerk on the selection screen.

Accordingly, with the self-service POS terminal 1 in the first embodiment, it is possible to better prevent a check target commodity from being sold to a sales unavailable target customer.

If the option 3 of the self-service mode is selected, the processor 31 also causes the touch panel 12 to display the check screen without buttons 122 if a check target commodity already identified as sales unavailable by the store clerk is registered as a purchase commodity again.

Accordingly, with the self-service POS terminal 1 in the first embodiment, it is possible to better avoid check omissions by the store clerk when a re-registration of a check target commodity already determined as sales unavailable is attempted by the customer.

In the self-service mode, the processor 31 can register the purchase commodity in the transaction file 321 and, in response to operation of the checkout button 124 by the customer, perform settlement for the purchase commodities registered in the transaction file 321. Therefore, the processor 31 performs registration in which the purchase commodity is registered by operation of the customer and settlement for the registered purchase commodities. If the option 4 of the self-service mode is selected, the processor 31 checks whether any check target commodity is included in the commodities registered in the transaction file 321. If a check target commodity is included, the processor 31 causes the touch panel 12 to display the check screen without buttons 122.

Accordingly, with the self-service POS terminal 1 in the first embodiment, it is possible to securely perform checks of all check target commodities by the store clerk at the time when settlement is about to be performed (at the end of the registration process).

If the option 4 of the self-service mode is selected, the processor 31 temporarily shifts to the store clerk mode if the sales unavailable button 127 is selected by the store clerk on the check screen with buttons 125 and cancels all the corresponding check target commodities from the transaction file 321 by manual operations of the store clerk in the store clerk mode. Therefore, the processor 31 performs cancellation after a sales unavailability determination by the store clerk by temporarily shifting the operation mode to store clerk mode and permitting the store clerk to cancel the check target commodities from the transaction.

Accordingly, with the self-service POS terminal 1 in the first embodiment, it is possible to more securely require checks and cancellations of the check target commodities by the store clerk.

Second Embodiment

Figure 10:
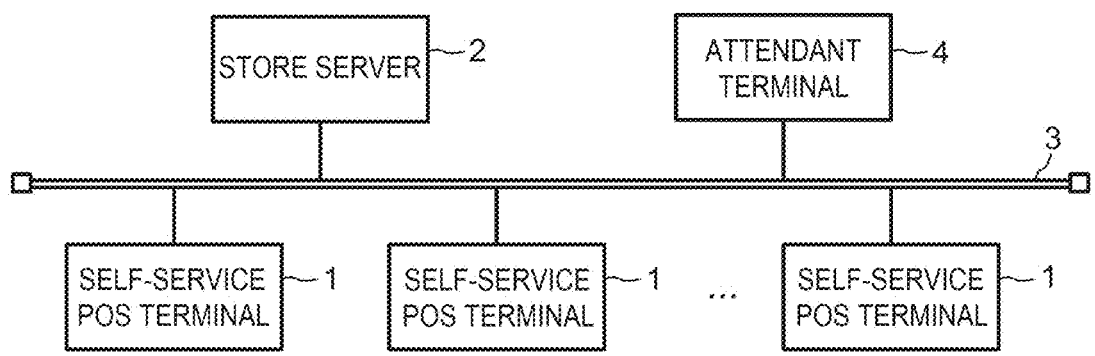
FIG. 10 depicts a schematic configuration of a full self-service scheme including a self-service POS terminal according to a second embodiment.

FIG. 10 is a schematic configuration diagram illustrating a settlement system for a full self-service scheme in a second embodiment. The settlement system includes an attendant terminal 4 in addition to a plurality of self-service POS terminals 1 and a store server 2. The attendant terminal 4 displays, on a display device, a list of purchase commodities registered at each of the self-service POS terminals 1. If an error occurs in the self-service POS terminals 1, the attendant terminal 4 provides information concerning the error to a store clerk, a so-called attendant, who operates the attendant terminal 4. The store clerk at the attendant terminal 4 monitors the self-service POS terminals 1 based on information displayed on the attendant terminal 4. Note that, in FIG. 10, the number of attendant terminals 4 is one. However, a plurality of attendant terminals 4 may be connected to the communication network 3 in some examples. In some examples, an attendant terminal 4 may be installed in another area of the store such as in a back office or at a help desk rather than in the checkout area. An attendant terminal 4 remote from the self-service POS terminal 1 may also receive error information from a self-service POS terminal 1 through the communication network 3. Accordingly, a store clerk present in a place where the self-service POS terminal 1 cannot directly be checked is still capable of monitoring the self-service POS terminal 1.

A general configuration of the self-service POS terminal 1 according to the second embodiment in the settlement system with an attendant terminal 4 is the same as the configuration in the first embodiment.

However, the self-service POS terminal 1 in this second embodiment is capable of operating in three operation modes including a self-service mode, a local store clerk mode, and a remote store clerk mode. The remote store clerk mode is a third operation mode and is for permitting remote operations of a store clerk via an attendant terminal 4.

Figure 11:
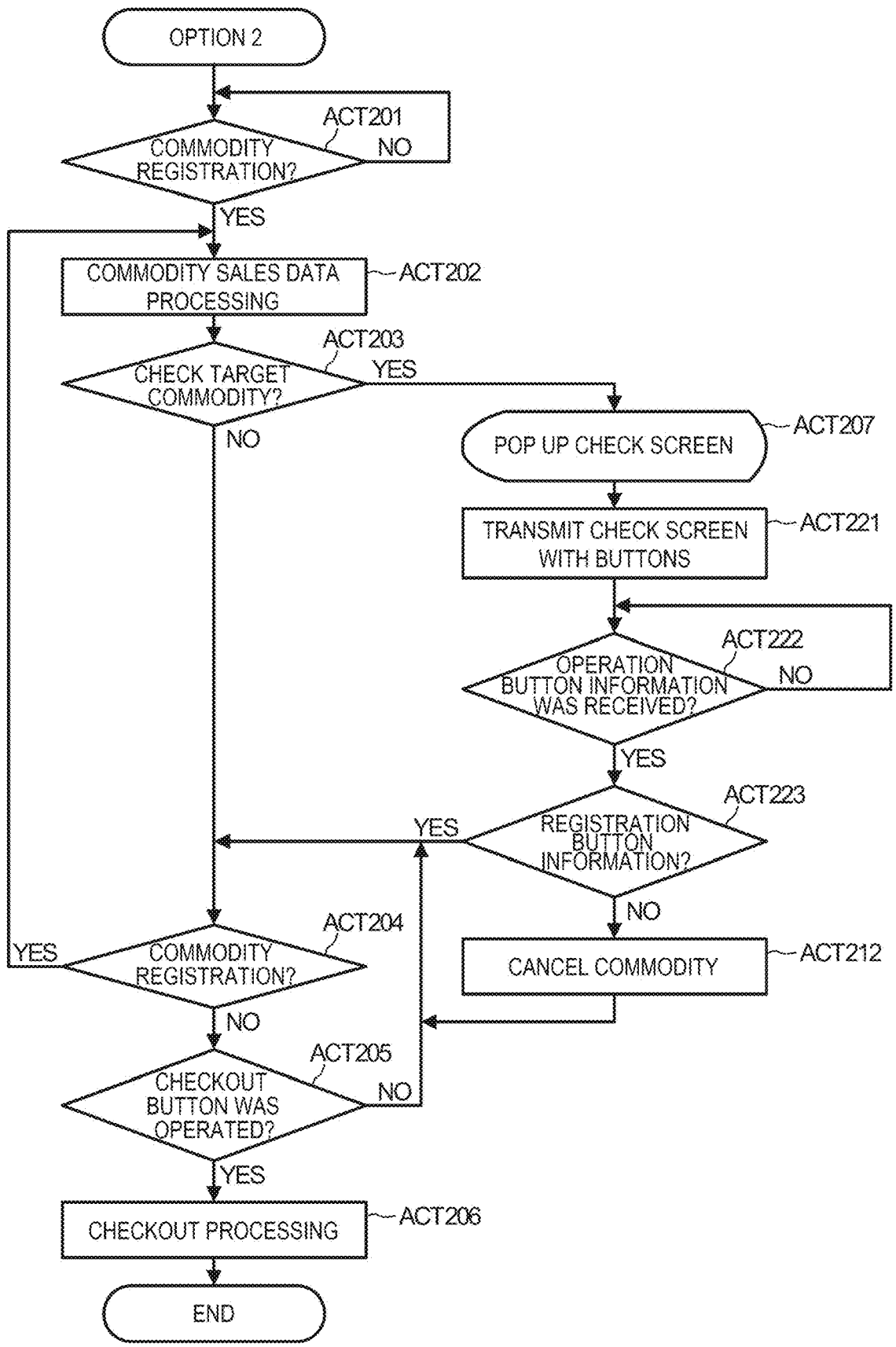
FIG. 11 is a flowchart of information processing executed by a processor of a self-service POS terminal in a self-service mode.
Figure 12:
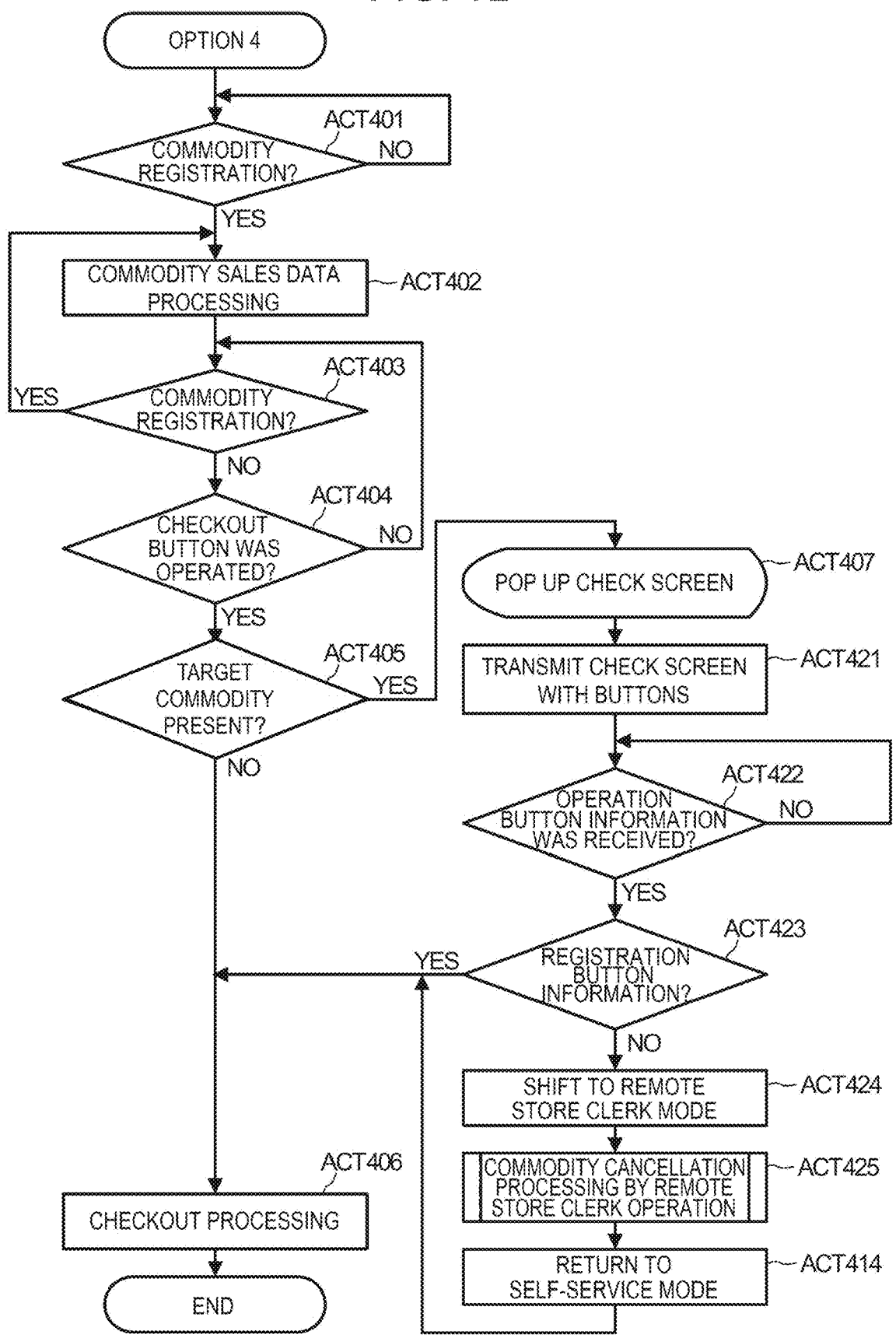
FIG. 12 is a flowchart of information processing executed by a processor of a self-service POS terminal in a self-service mode.

In the following explanation, an operation of the self-service POS terminal 1 in the second embodiment is explained with reference to FIG. 11 and FIG. 12. FIG. 11 is a flowchart of information processing executed by the processor 31 of the self-service POS terminal 1 when the option 2 is selected. FIG. 12 is a flowchart of information processing executed by the processor 31 when the option 4 is selected. Note that additional explanation of those operations that are the same or substantially the same as in the first embodiment may be omitted and when the relevant operations or aspects are the same (or substantially so), the same reference signs are used in FIG. 9 and in FIG. 4.

(1) If the Option 2 is Selected

As illustrated in FIG. 11, if the purchase commodity is a check target commodity, after popup-displaying the check screen without buttons 122 on the touch panel 12 in ACT 207, the processor 31, in ACT 221, transmits a check screen with buttons to the attendant terminal 4 through the communication network 3. This check screen with buttons may be the same as or similar to the check screen with buttons 125. However, this check screen with buttons provided at the attendant terminal 4 includes specific information identifying the relevant self-service POS terminal 1. At the attendant terminal 4, the check screen with buttons includes the identifies the relevant self-service POS terminal 1 on a display device. Accordingly, the check screen with buttons transmitted from the self-service POS terminal 1 provides error information for notifying an error occurrence at the self-service POS terminal 1. Note that, in the present example, a screen is transmitted. However, in other examples, just the error information may be transmitted and the attendant terminal 4 may analyze the error information, detect therein or therefrom the occurrence of a check target commodity registration at the self-service POS terminal 1, and then generate and display the check screen with buttons on the attendant terminal 4.

After transmitting the check screen with buttons (or error information) as explained above, the processor 31, in ACT 222, waits for operation button information from the attendant terminal 4 through the communication network 3. The operation button information is transmitted from the attendant terminal 4 according to selection of a registration button (acceptance) or a sales unavailable (denial) button on the check screen at the attendant terminal 4 by the store clerk.

The store clerk at the attendant terminal 4 may go to the relevant self-service POS terminal 1 in some instances and check any matter that should be checked or confirmed with the customer, for example, an identification (ID) check for the age of the customer. The store clerk may then return to the attendant terminal 4 and operate the registration button or the sales unavailable button on the check screen with buttons based on a check result.

Note that, if the result of the check is sales unavailable (sale denial), the store clerk may physically collect the check target commodity before returning to the attendant terminal 4. If the same type check target commodity is present in a basket or the like placed on the basket table 30, the store clerk can also collect these other check target commodity as well at this time. In addition, if other commodities of the same check classification (e.g., other age restricted items) are present, the store clerk can also collect these commodities as well. If the store clerk notices that a check target commodity of another check classification (e.g., a prescription item) is present in the basket or the like, the store clerk can at this time (in the same visit) confirm with the customer about the additional check classification item and, if sales is unavailable for the other check classification items, these can also be collected.

After operation button information has been received, the processor 31 determines YES in ACT 222 and proceeds to ACT 223.

In ACT 223, the processor 31 checks whether the received operation button information is registration button information corresponding to operation of the registration button. If so, the processor 31 determines YES in ACT 223 and proceeds to ACT 204.

If the received operation button information is not the registration button information, that is, the received operation button information is sales unavailable button information corresponding to operation of the sales unavailable button, the processor 31 determines NO in ACT 223 and proceeds to ACT 212.

If, after a check and visit by the store clerk, another commodity registration for a check target commodity is performed, a check screen with buttons for the check target commodity will be displayed at the attendant terminal 4. For a commodity of the same check type, the store clerk can immediately operate the registration button without going to the self-service POS terminal 1 if the previous check resulted in an approval.

(2) If the Option 3 is Selected

In this case, ACT 309 to ACT 312 of FIG. 8 are replaced with the operations in ACT 221 to ACT 223 in FIG. 11.

(3) If the Option 4 is Selected

As illustrated in FIG. 12, if a check target commodity is present, after popup-displaying the check screen without buttons 122 on the touch panel 12 in ACT 407, the processor 31, in ACT 421, transmits a check screen with buttons to the attendant terminal 4 through the communication network 3. This is the same as ACT 221 in the option 2.

After transmitting the check screen with buttons as explained above, the processor 31, in ACT 422, waits for operation button information from the attendant terminal 4. This is the same as ACT 222 in the option 2.

The store clerk goes to the relevant self-service POS terminal 1 and checks what should be checked with the customer, for example, the age of the customer. The store clerk returns to the attendant terminal 4 and operates the registration button or the sales unavailable button on the check screen with buttons based on a check result.

Note that, if the result of the check is sales unavailable, the store clerk generally collects the check target commodity before returning to the attendant terminal 4. If the same check target type commodity is present in a basket or on the basket table 30, the store clerk can collect these items as well. In addition, if other commodities with the same check classification are present, the store clerk may collect these commodities as well. If the store clerk notices that a check target commodity of another check classification is also present in the basket or the like, the store clerk can go ahead and confirm with the customer about this other check classification and, if sales denial is appropriate, the store clerk can also collect those other commodities in the same visit.

After operation button information is received, the processor 31 determines YES in ACT 422 and proceeds to ACT 423.

In ACT 423, the processor 31 checks whether the received operation button information is for operation of the registration button. This is the same as ACT 223 in the option 2. For receiving of registration button information, the processor 31 determines YES in ACT 423 and proceeds to ACT 406.

In contrast, if the received operation button information is not the registration button information, that is, the received operation button information indicates operation of the sales unavailable button, the processor 31 determines NO in ACT 423 and proceeds to ACT 424. In ACT 424, the processor 31 shifts from the self-service mode to the remote store clerk mode.

After shifting to the remote store clerk mode as explained above, the processor 31, in ACT 425, executes commodity cancellation processing by remote store clerk operation. The commodity cancellation processing by the remote store clerk operation is processing related to the store clerk operating the attendant terminal 4 and cancelling registration of a purchase commodity at the self-service POS terminal 1. The commodity cancellation processing related to the remote store clerk operation in ACT 425 ends according to a predetermined store clerk operation (e.g., button selection) at the attendant terminal 4.

After the commodity cancellation processing related to the remote store clerk operation is ended, the processor 31 proceeds to ACT 414.

In the first embodiment, if a check target commodity is sales unavailable (denied), the store clerk executes the cancellation of the check target commodity at the self-service POS terminal 1. However, in the second embodiment, the store clerk can carry out the cancellation at the attendant terminal 4.

Embodiments are not limited to the specific examples described above.

For example, in the option 2, although the check flags such as the adult (age) check flag, the drug (prescription verification) check flag, and the expensive (loss control) commodity check flag are not used, the check flags may be stored as in the case of the option 3.

In certain embodiments, it is the purchase of a particular commodity that requires a store clerk confirmation before purchase is completed. However, checks are not limited to those related to purchase-restricted items. For example, if a transaction or product discount for aged people (e.g., a senior citizen discount) can be provided to customers, an age check on a customer by a store clerk may also be considered necessary before the discount is applied. In this way, a discount target commodity may be set as a check target to make it possible to have a store clerk determine discount eligibility rather than product availability.

In the second embodiment, the check screen with buttons is transmitted to the attendant terminal 4 and displayed, the operation of the registration button or the registration unavailable button by the store clerk in the attendant terminal 4 is received, and, in the option 4, the cancellation processing at the attendant terminal 4 is carried out in the remote store clerk mode. However, in some examples, the attendant terminal 4 may simply be used to display of a check screen without buttons. That is, the attendant terminal 4 may also be incorporated the first embodiment and, when a check target commodity is present, a check request for the store clerk may be sent to the attendant terminal 4 together with a check request for the store clerk being signaled by the light emitting unit 13.

While certain embodiments of the present disclosure have been described, the embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. These embodiments and modifications fall within the scope and spirit of the disclosure and fall within the disclosure described in the claims and their equivalents.

What is claimed is:

1. A transaction settlement device, comprising:
a processor configured to:
acquire a product code for an item being registered in a sales transaction in a customer operating mode;
check whether the product code is associated with a sales restriction;
cause a display screen to display a clerk check screen when the product code is associated with the sales restriction;
enter a clerk operating mode after the display of the clerk check screen;
receive a sales availability instruction for the item corresponding to the acquired product code while in the clerk operating mode;
cancel a registration of the acquired product code in the sales transaction after a return to the customer operating mode from the clerk operating mode when the sales availability instruction indicates purchase is not approved;
permit the registration of the acquired product code in the sales transaction after the return to the customer operating mode from the clerk operating mode when the sales availability instruction indicates purchase is approved;
automatically set a sales permitted check flag for the acquired product code in a transaction file after the return to the customer operating mode from the clerk operating mode when the sales availability instruction indicates purchase is approved; and
permit the registration of another item with the same product code when the sales permitted check flag for the product code indicates a previous sales approval in the clerk operating mode.

2. The transaction settlement device according to claim 1, further comprising:
a display on which the clerk check screen can be displayed.

3. The transaction settlement device according to claim 2, further comprising:
a storage unit storing the transaction file in which product codes of items registered in the sales transaction are included.

4. The transaction settlement device according to claim 3, wherein the processor is further configured to automatically delete the acquired product code from the transaction file when canceling the registration of the acquired product code in the sales transaction after the return to the customer operating mode from the clerk operating mode when the sales availability instruction indicates purchase is not approved.

5. The transaction settlement device according to claim 1, wherein the processor is further configured to permit the registration of another item of a same restriction type when the sales permitted check flag for a product code with the same restriction type indicates a previous sales approval in the clerk operating mode.

6. The transaction settlement device according to claim 1, wherein the check whether the product code is associated with the sales restriction occurs after a product registration complete button is operated.

7. The transaction settlement device according to claim 1, wherein the check whether the product code is associated with the sales restriction occurs immediately after the product code is acquired.

8. A point-of-sale terminal, comprising:
a display unit;
a light emitting unit;
a product scanner to acquire product codes from items being registered in a sales transaction for purchase; and
a processor configured to:
acquire a product code for an item being registered in the sales transaction in a customer operating mode;
check whether the product code is associated with a sales restriction;
cause a clerk check screen to be displayed on the display unit when the product code is associated with the sales restriction;
cause the light emitting unit to indicate a clerk is required at the point-of-sale terminal whenever the product code is associated with the sales restriction;
enter a clerk operating mode after the display of the clerk check screen;
receive a sales availability instruction for the item corresponding to the acquired product code while in the clerk operating mode;
cancel a registration of the acquired product code in the sales transaction after a return to the customer operating mode from the clerk operating mode when the sales availability instruction indicates purchase is not approved;
permit the registration of the acquired product code in the sales transaction after the return to the customer operating mode from the clerk operating mode when the sales availability instruction indicates purchase is approved;
automatically set a sales permitted check flag for the acquired product code in a transaction file after the return to the customer operating mode from the clerk operating mode when the sales availability instruction indicates purchase is approved; and
permit the registration of another item of a same restriction type when the sales permitted check flag for a product code with the same restriction type indicates a previous sales approval in the clerk operating mode.

9. The point-of-sale terminal according to claim 8, wherein the product scanner is a barcode reader.

10. The point-of-sale terminal according to claim 9, further comprising:
a storage unit storing the transaction file in which the product codes of items registered in the sales transaction are included.

11. The point-of-sale terminal according to claim 10, wherein the processor is further configured to automatically delete the acquired product code from the transaction file when canceling the registration of the acquired product code in the sales transaction after the return to the customer operating mode from the clerk operating mode when the sales availability instruction indicates purchase is not approved.

12. The point-of-sale terminal according to claim 8, wherein the processor is further configured to permit the registration of another item with the same product code when the sales permitted check flag for the product code indicates a previous sales approval in the clerk operating mode.

13. The point-of-sale terminal according to claim 8, wherein the check whether the product code is associated with the sales restriction occurs after a product registration complete button is operated.

14. The point-of-sale terminal according to claim 8, wherein the check whether the product code is associated with the sales restriction occurs immediately after the product code is acquired.

15. The point-of-sale terminal according to claim 8, further comprising:
a communication interface connectable to an attendant terminal, wherein
the processor is further configured to transmit a notification to the attendant terminal whenever the product is associated with the sales restriction.

16. A point-of-sale system, comprising:
an attendant terminal;
a point-of-sale terminal connected to the attendant terminal via a network connection, the point-of-sale terminal comprising:
a display unit;
a product scanner to acquire product codes from items being registered in a sales transaction for purchase; and
a processor configured to:
acquire a product code for an item being registered in the sales transaction in a customer operating mode;
check whether the product code is associated with a sales restriction;
cause a clerk check screen to be displayed on the display unit when the product code is associated with the sales restriction;
transmit a notification to the attendant terminal whenever the product is associated with the sales restriction;
enter a clerk operating mode after the display of the clerk check screen;
receive a sales availability instruction for the item corresponding to the acquired product code while in the clerk operating mode;
cancel a registration of the acquired product code in the sales transaction after a return to the customer operating mode from the clerk operating mode when the sales availability instruction indicates purchase is not approved;
permit the registration of the acquired product code in the sales transaction after the return to the customer operating mode from the clerk operating mode when the sales availability instruction indicates purchase is approved;
automatically set a sales permitted check flag for the acquired product code in a transaction file after the return to the customer operating mode from the clerk operating mode when the sales availability instruction indicates purchase is approved;
permit the registration of another item with the same product code when the sales permitted check flag for the product code in the transaction file indicates a previous sales approval; and
permit the registration of another item of a same restriction type when the sales permitted check flag for a product code with the same restriction type indicates a previous sales approval.

17. The point-of-sale system according to claim 16, wherein the check whether the product code is associated with the sales restriction occurs immediately after the product code is acquired.

18. The point-of-sale system according to claim 16, further comprising:
a storage unit for storing the transaction file in which the product codes of items registered in the sales transaction are included.

19. The point-of-sale system according to claim 16, wherein the product scanner is a barcode reader.

20. The point-of-sale system according to claim 16, wherein the check whether the product code is associated with the sales restriction occurs after a product registration complete button is operated.

* * * * *